Dec. 24, 1935.  E. R. MARSTERS  2,025,064
SPOTLIGHT
Filed May 16, 1934  2 Sheets-Sheet 2
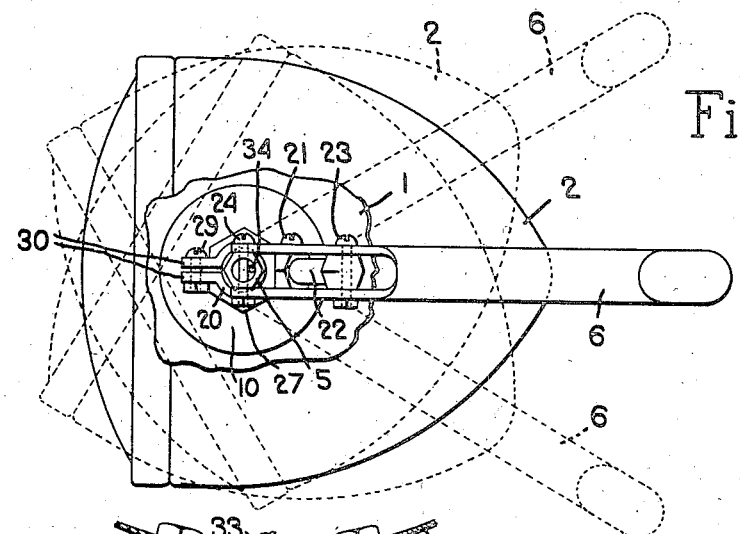
Fig. 2.
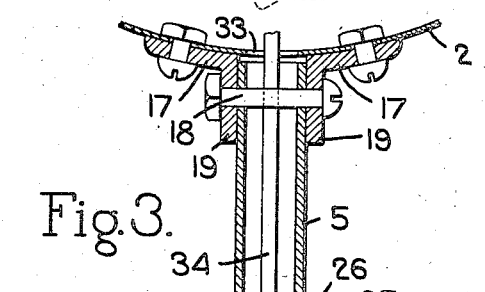
Fig. 3.
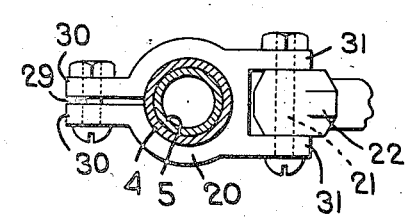
Fig. 4.
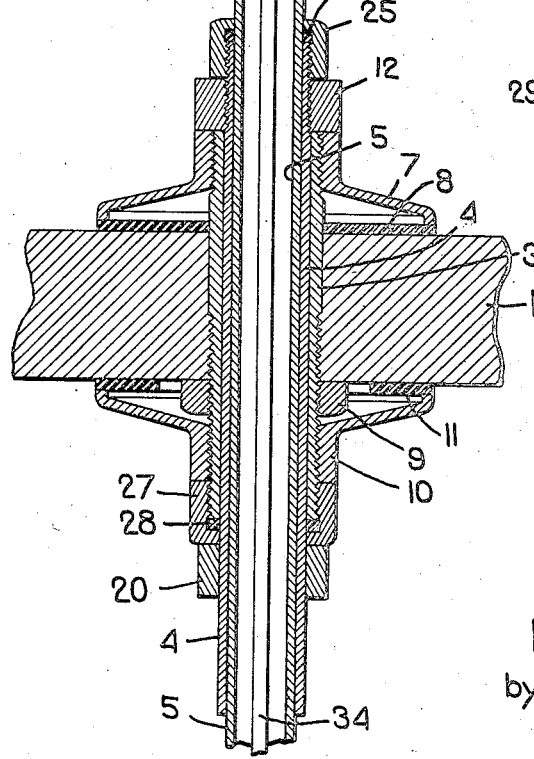
Inventor.
Ernest R. Marsters
by Heard Smith & Tennant.
Attys.

Patented Dec. 24, 1935

2,025,064

UNITED STATES PATENT OFFICE 2,025,064

SPOTLIGHT

Ernest R. Marsters, Arlington, Mass.

Application May 16, 1934, Serial No. 725,931

3 Claims. (Cl. 240—61.13)

This invention relates to spotlights or searchlights of the type that are adapted to be attached to the outside of an automobile or truck and to be manipulated from the inside thereof. The invention has been specially designed for use on the roof of a service truck such as is used by electric light companies in locating trouble in and making repairs on transmission lines, although the invention is not limited to this use as it has a wide variety of uses, such as in connection with pilot houses of steamboats or wherever a searchlight is attached to the outside of a vehicle or building and is to be manipulated from the inside thereof.

The service trucks above referred to which are used by electric light companies are usually equipped with spotlight on the roof which can be directed upwardly onto the poles and wires of the transmission line as the truck is moving along the street so as to assist in locating trouble or making repairs.

One of the objects of the present invention is to provide an improved remote control for a spotlight or search-light of this type which is provided with a manipulating handle within the truck or vehicle that extends substantially parallel to the beam of light projected by the spotlight and which is so constructed that this parallel arrangement will be maintained while the spotlight is being manipulated by the handle. With this construction the search-light follows the movement of the handle as the latter is manipulated so that the position of the handle always indicates the direction in which the beam of light is being thrown.

An advantage of this construction is that the movements of the hand of the operator in manipulating the search-light to direct the beam of light into any given spot or to change the direction of the beam of light is similar to and substantially a duplicate of the movement which the operator would give his hand if he were holding a flashlight in the hand and were directing it onto said spot or were correspondingly changing the direction of the beam of light from the flashlight. The movement which one gives to his hand when training a beam from a flashlight on any object is a very natural movement and with the present invention this same natural movement is employed for directing the beam from the searchlight onto any object or for changing the direction of said beam of light.

Other objects of the invention are to provide improvements in search-lights of this type which will be more fully hereinafter set forth and then pointed out in the appended claims.

In the drawings wherein I have illustrated a selected embodiment of my invention, Fig. 1 is a side view of a search-light embodying the invention showing it mounted on the roof of a truck or other vehicle;

Fig. 2 is a bottom plan view of Fig. 1;

Fig. 3 is an enlarged section on the line 3—3, Fig. 1;

Fig. 4 is an enlarged section on the line 4—4, Fig. 1;

Figure 1:
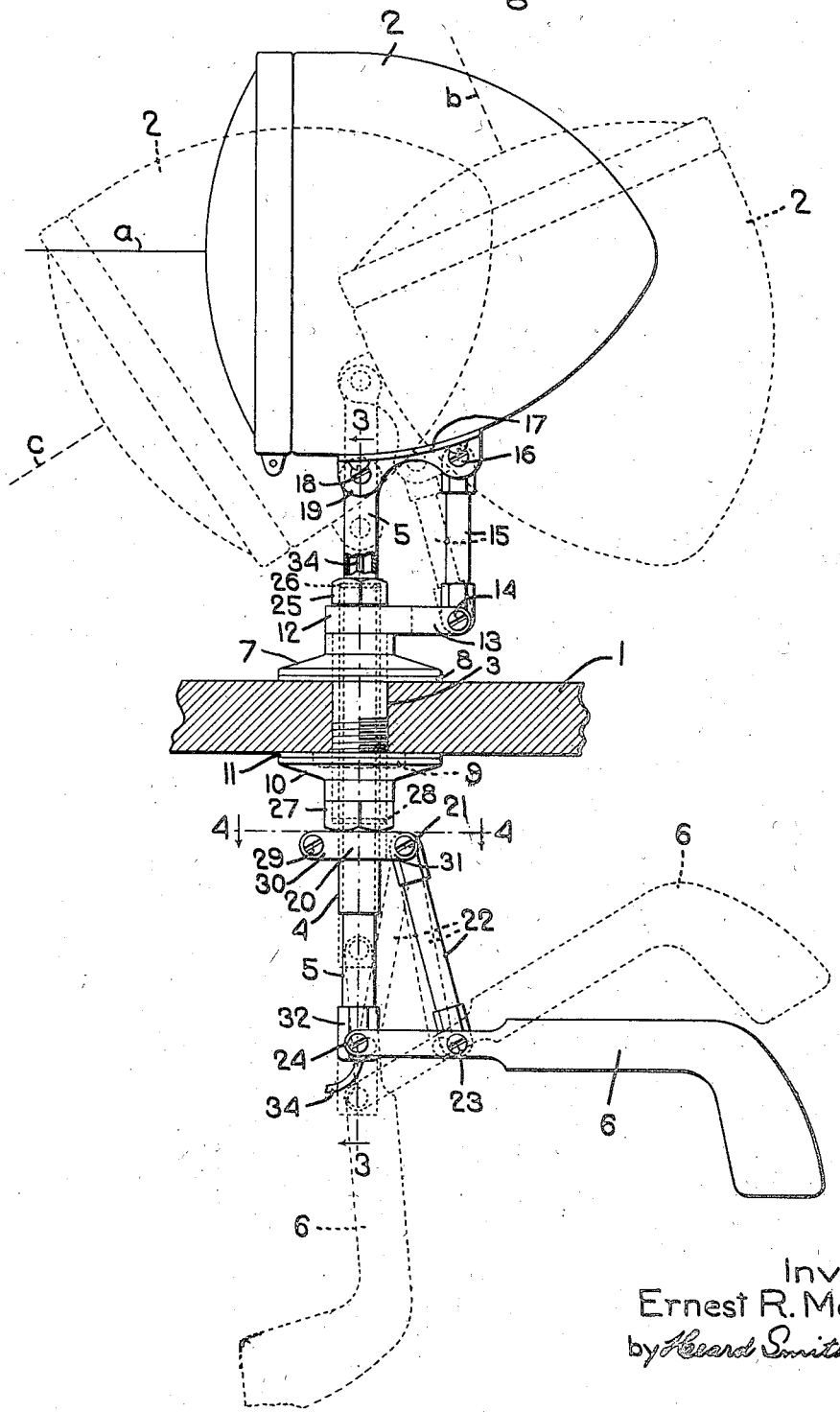

In the drawings 1 indicates the roof of a truck or other motor vehicle or one of the walls thereof or the wall of the building to which the search-light is secured. The search-light is indicated at 2 and it may be of any suitable or usual construction.

The mounting for the search-light comprises a bushing 3 which extends through the roof or wall 1 and is retained in place therein in some suitable way, a sleeve 4 extending through the bushing 3 and rotatively mounted therein and a tubular stem 5 extending through the sleeve 4 and mounted therein for sliding movement in the direction of its axis, the outer end of the sleeve and stem being connected to the search-light 2 by means presently to be described, and the inner end of said sleeve and stem being connected by means also presently to be described to a remote control handle 6 by which the search-light is manipulated.

The bushing 3 is shown as having a flanged collar 7 which is clamped against the outside surface of the wall 1, there preferably being a packing washer 8 between the flanged collar 7 and the wall to make a tight joint. The inner end of the bushing 3 is shown as having a nut 9 screw threaded thereto which engages the inner surface of the wall 1, said nut and flange 7 thus operating to clamp the bushing 3 firmly in the wall 1 with one end of the bushing projecting through to the outside of the wall and the other projecting through to the inside of the wall.

10 indicates a second flanged collar screw threaded to the inner end of the bushing 3 and which provides a suitable finish. 11 indicates a packing washer which I prefer to use and which is interposed between the flanged collar 10 and the inner face of the wall 1. The flanged collars 7 and 10 thus serve to give an appropriate finish to the mounting.

The sleeve 4, which is mounted for rotation in the bushing 3, extends through the upper end of the bushing and the projecting end of the sleeve has a collar 12 made fast thereto in some suitable way as by being screw threaded thereto. This collar 12 is provided with an extension 13 to which is pivotally mounted at 14 the lower end of a link 15, the upper end of said link being pivoted at 16 to a bracket member 17 that is secured to and carried by the search-light 2.

The outer end of the sleeve 5 extends beyond the collar 12 and is pivotally connected at 18 to the bracket 17. This bracket 17 is shown as having two ears 19 between which the upper end of the stem 5 is received, and the pivot bolt 18 extends through the ears and the stem as shown best in Fig. 3. The pivotal connection 16 between the link 15 and the bracket 17 is similar to that between the stem 5 and said bracket.

The inner end of the sleeve 4 projects inwardly beyond the inner end of the bushing 3 and has fast thereto a collar 20 to which is pivoted at 21 the upper end of a link 22, the lower end of said link being pivoted at 23 to the handle 6. The stem 5 extends through the sleeve 4 for a suitable distance and the lower end of the stem is pivotally connected at 24 to the inner end of the handle 6. The handle 6 is shown as of the pistol-grip type because this makes a most convenient handle for the operator to grasp, but the shape of the handle might be varied without departing from the invention.

The construction is such that the links 15 and 22 are on the same side of the stem and the connections between the handle and the search-light are so constructed and the search-light is so mounted that the beam of light directed therefrom extends not only in a direction parallel to the handle 6 but in the direction in which the handle 6 points. Furthermore, the construction above described is such that as the position of the handle 6 is shifted a corresponding shift in direction will take place in the search-light and in the beam directed therefrom.

The device is shown in full lines in Fig. 1 with the search-light in horizontal position and with the beam directed horizontally therefrom along the line a, and the handle 6 is also in a horizontal position and is pointing in a direction parallel to the beam a. If it is desired to direct the beam of light upwardly the operator manipulates the pistol-grip handle 6 so as to point it upwardly as indicated in the lower dotted lines Fig. 1. This swinging of the handle 6 from the horizontal full line position to the more or less vertical dotted line position causes the handle to pivot about the pivot 23 as a center and causes the inner end of the handle which is connected to the stem 5 to move upwardly, the link 22 meanwhile swinging inwardly about its pivot 21 so as to permit of the right line movement of the pivotal connection 24. The upward movement of the stem turns or pivots the search-light 2 about its pivotal connection 16 thereby directing the search-light upwardly and during this movement the upper end of the link 15 will swing inwardly so as to permit of a right line movement of the pivotal connection 18 between the stem and the search-light. With the search-light thrown into the dotted line position the beam of light is directed upwardly as indicated by the line b in the direction in which the handle 6 is pointed.

If it is desired to direct the light downwardly the handle 6 will be swung into the upper dotted line position so as to point downwardly and this movement will move the stem 5 downwardly through the sleeve 4 thus tilting the search-light downwardly so that the beam will be directed along a path c in the direction in which the handle 6 is then pointed.

By swinging the handle 6 laterally about its inner end as a pivot the sleeve 4 and the stem 5 will be turned in the bushing 3 thereby swinging the light about the axis of the stem, and in all adjusted positions the beam from the light will always be directed in the direction in which the handle 6 points.

With this device, therefore, the light may be directed up or down or laterally or any combination of the two directions so as to direct the beam of light to any desired point and in all manipulations of the handle the beam of light is directed in the direction in which the handle 6 points. This is an important feature of this invention because the manipulation of the search-light involves only the natural movement of the hand which a person would make if he were holding a flashlight in his hand and wished to direct it to any particular spot.

The sleeve 4 is shown as extending slightly above the collar 12 and a packing nut 25 containing packing 26 is screwed to the upper end of the sleeve. This packing nut not only makes a tight joint and prevents rain from leaking through the mounting between the sleeve and the stem but the packing 26 also provides a certain amount of friction with the stem which is sufficient to hold the stem in any adjusted position if the handle is released.

There is a similar cap 27 and packing 28 secured to the lower end of the bushing below the flanged collar 10. This cap 27 and packing 28 makes a tight joint at this point and the packing has sufficient frictional engagement with the sleeve so as to prevent it from having rotative movement in the bushing in case the handle 6 is released.

The provision of the two packing gaskets 26 and 28 thus serves to frictionally hold the stem and the sleeve in any adjusted position so that after the search-light has been set the handle may be released and the search-light will remain in its adjusted position until the handle is again manipulated.

The collar 20 is shown as a split collar (see Fig. 4) having the two ears 30 and said collar is clamped to the sleeve by the clamping bolt 29 which extends through the ears. This collar is shown as having two arms 31 between which the upper end of the link 22 extends, the pivotal connection 21 extending through the arms and said upper end of the link.

The inner end of the handle 6 will preferably be forked to embrace the lower end 32 of the stem 5.

The lamp 2 may be of the type employing either a double contact bulb or a single contact bulb, but in either event the wiring for the lamp will extend through the tubular stem 5 and through an opening 33 in the casing of the lamp 2. If the bulb is a single contact bulb then one of the socket terminals will be grounded on the lamp casing and the other socket terminal will be connected to a single circuit wire 34, which is shown as extending axially through the tubular stem 5 and through the opening 33 in the lamp casing.

The advantage in locating the circuit wire within the tubular stem 5 is that said wire is entirely out of the way and will not become twisted or tangled during the manipulation of the handle 6.

The improvements above described provide a remote control for a search-light which includes a pointing handle adapted to be manually manipulated and means whereby when the handle is manipulated the beam of light will follow the handle and will always be directed in the general direction in which the handle is pointing.

While the device is of special advantage in connection with the service truck of electric light companies as stated above, yet it is also useful wherever a spotlight is required.

While I have illustrated and described a selected embodiment of the invention yet it will be obvious that various changes in the details of the construction will be made without departing from the invention.

I claim:

1. A spotlight with remote control comprising a bushing extending through a supporting wall, a sleeve extending through and rotatively mounted in the bushing, a tubular stem extending through the sleeve and slidable longitudinally thereof, a collar fast on the sleeve beyond the outer end thereof, a link pivoted to the collar, a lamp pivotally connected both to the stem and the link, circuit wires leading from the lamp through the tubular stem, a second collar fast on the inner end of the sleeve, a second link pivoted to said second collar, both links being at the same side of the sleeve, and a handle pivoted at one end to the inner end of the stem and intermediate of its ends to said second link, the link connections between said sleeve and both the lamp and the handle having such a relation that in all positions of the handle the latter extends in a direction parallel to the beam of light whereby movement of the handle will give a corresponding movement to the lamp in the same direction, and the beam of light projected from the lamp will follow the movement of the handle and will always be directed in the direction in which the handle points.

2. A spotlight with remote control comprising a sleeve extending through and mounted for rotation in a supporting wall, a stem extending through the sleeve and slidable longitudinally thereof, a collar fast on the outer end of the sleeve, a lamp pivoted to the outer end of the stem, a link pivotally connecting said lamp and collar, a pistol-grip handle pivoted to the inner end of the stem, and a link pivotally connecting said pistol-grip handle to the inner end of the sleeve, whereby movement of the handle in any direction produces a corresponding movement of the lamp, said pivotal connections being such that in all positions of the handle the beam of light is directed in the direction in which the pistol-grip handle points.

3. A spotlight with remote control comprising a bushing extending through a supporting wall, a sleeve extending through and rotatively mounted in the bushing, a tubular stem extending through the sleeve and slidable longitudinally thereof, a collar fast on the sleeve beyond the outer end thereof, a link pivoted to the collar, a lamp pivotally connected both to the stem and the link, a second collar fast on the inner end of the sleeve, a second link pivoted to said second collar, both links being at the same side of the sleeve, a handle pivoted at one end to the inner end of the stem and intermediate of its ends to said second link, a packing ring carried by the outer end of the sleeve and frictionally engaging the stem, and a second packing ring carried by the inner end of the bushing and frictionally engaging the sleeve, said packing rings providing sufficient frictional engagement with the stem and the sleeve to hold the lamp in any adjusted position, the length of the links and the pivotal mounting of the lamp and handle being such that the beam of light is directed in a direction parallel to that in which the handle points and movement of the handle in any direction will give a corresponding movement in the same direction to the lamp.

ERNEST R. MARSTERS.